Figure 1:
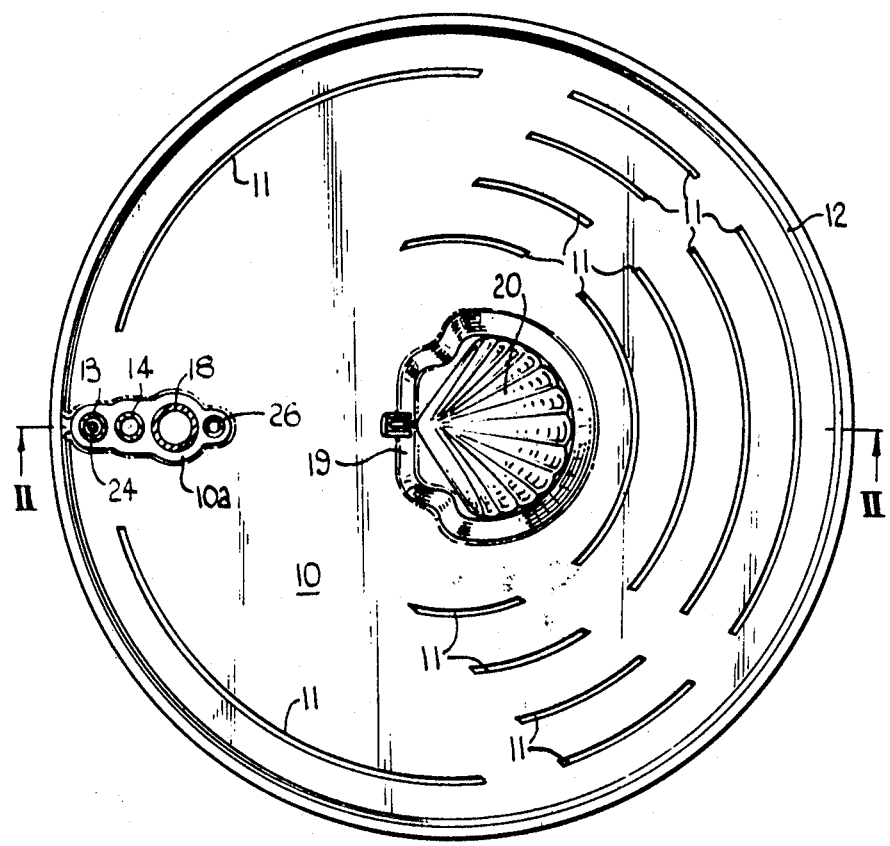

United States Patent

[11] 3,624,777

| [72] | Inventor | William James Gardner<br>472 Oldham Road, Miles Platting,<br>Manchester M10, 7JA Lancashire, England |
|---|---|---|
| [21] | Appl. No. | 21,459 |
| [22] | Filed | Mar. 20, 1970 |
| [45] | Patented | Nov. 30, 1971 |
| [32] | Priority | Mar. 20, 1969 |
| [33] | | Great Britain |
| [31] | | 14,621/69 |

[54] FISH TANK FILTER
13 Claims, 2 Drawing Figs.

[52] U.S. Cl. .................................................. 210/169
[51] Int. Cl. .................................................. B03d 1/14
[50] Field of Search .......................................... 210/169, 220, 221

[56] References Cited
UNITED STATES PATENTS
2,935,199  5/1960  Willinger .................... 210/169
3,119,774  1/1964  Arak .......................... 210/169

*Primary Examiner*—Reuben Friedman
*Assistant Examiner*—Charles N. Hart
*Attorney*—William J. Daniel ABSTRACT: A fish tank filter having a perforated base which is arranged to seat spaced from the bottom of a fish tank, there being two air supply tubes and one tube for delivering a stream of air and water upwardly, one air supply tube together with said latter tube serving to cause a syphonic effect in the water in said tank so that foreign matter in the water is filtered through gravel or like permeable material placed on said base, the other of said air supply tubes being arranged to deliver a supply of air to a position beneath a hinged lid so that when an amount of air has collected in an air collection chamber beneath said hinged lid, the lid is lifted to allow a relatively large bubble of air to rise up through the water. The ratio of air pressures supplied to the two air supply tubes is controlled by a control valve attached to the inlet ends of said tubes.

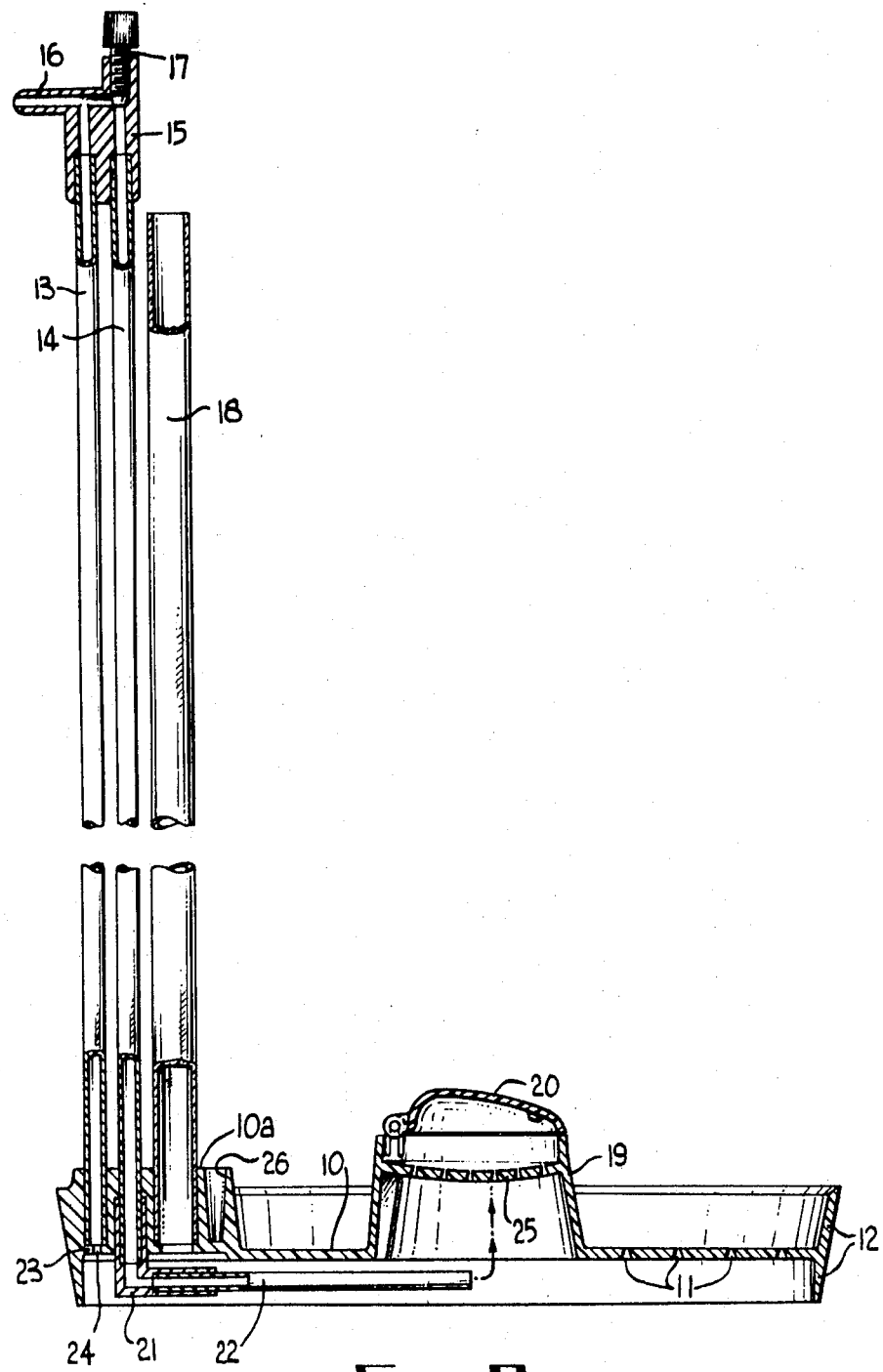

FISH TANK FILTER

This invention relates to filters for fish tanks. Such filters are generally known as under-gravel filters and consist basically of a plate adapted to be positioned in the lower region of a fish tank but spaced above the base thereof so as to define a clean water collection chamber between the underside of the plate and the bottom of the tank. The plate is adapted, in use, to support an amount of gravel or other particulate or water-permeable matter. Means are provided for delivering a stream of air from outside of the tank to the clean water collection chamber below said plate; and passage means such as a tube communicating with said chamber is provided for transmitting a flow of water and air upwardly from said chamber to the upper regions of the tank. Thus said air stream causes a stream of water and air to move upwardly through said tube with the result that water in the tank is drawn downwardly through the gravel, and foreign matter contained in the water is filtered by the gravel.

According to the present invention, a fish tank filter includes a perforated base and means for supporting said base spaced from the bottom of a fish tank thus, in use, to define below said base a clean water collection chamber; means for delivering a stream of air to said clean water collection chamber and means for transmitting a stream of water and air upwardly from said chamber, characterized in that there is provided further air supply means; an air collection chamber adjacent said base; and communicating with said further air supply means, said air collection chamber being so arranged as to collect the air from said further air supply means and intermittently release said collected air in the form of a bubble.

An embodiment of the invention will now be described, by way of example only, with reference to the accompanying drawings, in which:

FIG. 1 is a plan view of the filter to be described, the upper part of the device having been omitted for the sake of clarity; and FIG. 2 is a section taken on line II—II of FIG. 1.

A fish tank filter, in accordance with the drawings, comprises a circular base plate 10 having a number of arcuate slots or perforations 11 therein and surrounded by a peripheral flange or wall 12. Adjacent the periphery of the base plate 10 in a thickened region 10a, are three apertures and located within each of two of the apertures is an air supply tube 13, 14. The two tubes 13 and 14 are attached at their free ends to a control valve 15 having a single air inlet pipe 16. The control valve 15 is adapted to divide a stream of air supplied thereto into the two air supply tubes 13, 14. The ratio of air pressures supplied to the tubes 13, 14 is controlled by a variable valve member 17 which can be adjusted to control the airflow to tube 14, and thus the residual airflow to tube 13. Located in the third aperture is a further tube 18 having an open end which in use is disposed just below the surface of the water in the tank.

In the central region of the base plate 10 is a raised portion 19 in the form of a hollow inverted container having a weighted hinged lid 20. The air supply tube 14 has an elbow joint 21 for an extension tube 22 which extends parallel to and below the base plate 10 to a position below the raised portion 19. The hinged lid 20 is preferably in the form of a shell for the purpose of decoration. The other air supply tube 13 extends into the thickened portion 10a of the base plate 10 but the latter contains, across the appropriate aperture, a web 23 having a small pin hole 24 therein such that air supplied to the tube 13 is restricted in its passage through the base plate 10. The raised portion 19 of the base plate 10 has an internal perforated web 25 whose purpose will be described, and the web 25 is spaced from and concave with respect to the hinged lid 20.

A further, tapered aperture 26 is formed in the thickened portion 10a of the base plate 10 and is adapted in use to receive and retain stalks of plants or similar decorative matter.

In use therefore, the filter is placed in the bottom of a fish tank and gravel or similar particulate or water permeable matter is placed on top of the plate to a level just below the hinged lid 20. Air supplied to the control valve 15 passes partly down air supply tube 13 and thereafter upwardly through the open ended tube 18 so that a continuous flow of air bubbles are supplied to the water in the tank. The action of the bubbles rising up the tube 18 causes a current of water to flow with them which produces a syphon effect and causes water to be drawn downwardly through the gravel to filter off any foreign matter. Thus a continual movement of water takes place in the tank.

The remainder of the air supply stream is passed along the other air supply tube 14 and dispersed as a series of bubbles into an air collection chamber formed between the hinged lid 20 and the web 25. At periodic intervals, therefore, sufficient air collects below the lid 20 to lift it so that a relatively large bubble of air is allowed to pass upwardly through the water. Thereafter the lid falls back into place and more air is collected.

The purpose of the web 25 is to prevent any matter such as gravel, or indeed fish, from entering the air collection chamber while the lid 20 is opened and falling into the clean water collecting chamber beneath the base plate 10. The web 25 is concave relative to the lid so that should any gravel particles float into the air collection chamber there is enough room for them to rest on the web 25 whilst still allowing the lid 20 to close. Any such matter should be expelled upon release of the next air bubble.

The base plate 10, thickened portion 10a, raised portion 19 and the peripheral flange 12 are preferably integrally molded from rigid or semirigid polyethylene or similar noncorrodable material, and the hinged lid 20 is of a similar material to the base plate. The various parts can be made transparent or opaque according to aesthetic requirements. The tubes 13, 14 and 18 are preferably transparent and are a friction fit within the base so as to be removable for packaging and cleaning purposes.

A filter made in accordance with the invention can be located in the base of the ornamental container described and claimed in my copending application for Pat. No. 8804/68 in which there is provided a base having a light source therein so that each time the hinged lid is lifted, the bubble of air apart from supplying oxygen to the water carries with it light from the base. The overall effect therefore is that there is provided an improved filter which, with the action of the hinged lid, provides a novel and aesthetic appearance.

I claim:

1. A fish tank filter including a perforated base and means for supporting said base spaced from the bottom of a fish tank thus, in use, to define below said base a clean water collection chamber; means for delivering a stream of air to said clean water collection chamber; and means for transmitting a stream of water and air upwardly from said chamber, characterized in that there is provided further air supply means; an air collection chamber adjacent said base; and communicating with said further air supply means, said air collection chamber being so arranged as to collect the air from said further air supply means and intermittently release said collected air in the form of a bubble.

2. A fish tank filter according to claim 1, including two air inlet tubes and one outlet tube, said tubes extending upwardly from said perforated base, there being also provided a control valve having two outlets connected to said two inlet tubes and an inlet pipe for supplying air to said valve, said valve being adjustable to control the ratio of air pressures supplied to said inlet tubes.

3. A fish tank filter according to claim 2, in which a first inlet tube is so positioned relative to said base as to deliver a stream of air to said clean water collection chamber, and a second inlet tube passes through said base and extends parallel to and beneath said base to a position below said air collection chamber.

4. A fish tank filter according to claim 2, in which said outlet tube communicates at its lower end with said clean water collection chamber and its upper end is open.

5. A fish tank filter according to claim 1, in which said air collection chamber is defined by a raised portion of said base, there being a hinged lid on said raised portion, and a perforated web extending across said raised portion below said hinged lid.

6. A fish tank filter according to claim 5, in which said raised portion is in the form of a hollow inverted container communicating with said clean water collection chamber, said hinged lid being mounted on said container remote from said base.

7. A fish tank filter according to claim 5, in which said perforated web is spaced from said hinged lid to define therewith said air collection chamber.

8. A fish tank filter according to claim 7, in which said perforated web is concave with respect to said hinged lid.

9. A fish tank filter according to claim 5 in which said hinged lid is formed in the shape of a shell.

10. A fish tank filter according to claim 1, in which the base comprises a base plate having a peripheral flange extending from both sides of said base plate, thus forming a peripheral wall above and below said base plate.

11. A fish tank filter according to claim 10, in which said inlet tubes and said outlet tube are mounted in apertures in a thickened region of said base plate.

12. A fish tank filter according to claim 3, in which said first inlet tube communicates with said clean water collection chamber via a pinhole in said base.

13. A fish tank filter according to claim 11, in which said thickened region includes an aperture for receiving the stalks of plant life or other decorative matter.

* * * * *